United States Patent
Kim et al.

(10) Patent No.: US 11,831,006 B2
(45) Date of Patent: Nov. 28, 2023

(54) ELECTRODE, SECONDARY BATTERY INCLUDING THE ELECTRODE, AND METHOD OF PREPARING THE ELECTRODE

(71) Applicant: LG Chem, Ltd., Seoul (KR)

(72) Inventors: Seul Ki Kim, Daejeon (KR); Tae Gon Kim, Daejeon (KR); Je Young Kim, Daejeon (KR); Wang Mo Jung, Daejeon (KR); Jung Woo Yoo, Daejeon (KR); Sang Wook Lee, Daejeon (KR)

(73) Assignee: LG Energy Solution, Ltd.

(*) Notice: Subject to any disclaimer, the term of this patent is extended or adjusted under 35 U.S.C. 154(b) by 391 days.

(21) Appl. No.: 17/043,362

(22) PCT Filed: Apr. 8, 2019

(86) PCT No.: PCT/KR2019/004127
§ 371 (c)(1),
(2) Date: Sep. 29, 2020

(87) PCT Pub. No.: WO2019/194662
PCT Pub. Date: Oct. 10, 2019

(65) Prior Publication Data
US 2021/0020907 A1 Jan. 21, 2021

(30) Foreign Application Priority Data
Apr. 6, 2018 (KR) .......... 10-2018-0040574
Apr. 5, 2019 (KR) .......... 10-2019-0040100

(51) Int. Cl.
*H01M 4/133* (2010.01)
*H01M 4/1393* (2010.01)
(Continued)

(52) U.S. Cl.
CPC ......... *H01M 4/133* (2013.01); *H01M 4/1393* (2013.01); *H01M 4/364* (2013.01);
(Continued)

(58) Field of Classification Search
CPC .... H01M 4/133; H01M 4/1393; H01M 4/364; H01M 4/623; H01M 4/8828;
(Continued)

(56) References Cited

U.S. PATENT DOCUMENTS

2003/0099883 A1   5/2003   Ochoa et al.
2007/0202403 A1   8/2007   Oh et al.
(Continued)

FOREIGN PATENT DOCUMENTS

CN   204927432 U   12/2015
CN   107104245 A   8/2017
(Continued)

OTHER PUBLICATIONS

Search report from International Application No. PCT/KR2019/004127, dated Jul. 12, 2019.
(Continued)

*Primary Examiner* — Gary D Harris
(74) *Attorney, Agent, or Firm* — Lerner David LLP

(57) ABSTRACT

An electrode includes an electrode active material, wherein the electrode active material layer includes an electrode active material, polyvinylidene fluoride, and a conductive agent, wherein the conductive agent includes a carbon nanotube structure in which 2 to 5,000 single-walled carbon nanotube units are bonded to each other, and the carbon nanotube structure is included in an amount of 0.01 wt % to 0.5 wt % in the electrode active material layer. A secondary battery including the same, and a method of preparing the electrode are also provided.

18 Claims, 8 Drawing Sheets

(51) Int. Cl.
*H01M 4/36* (2006.01)
*H01M 4/62* (2006.01)
*H01M 4/88* (2006.01)
*H01M 10/0525* (2010.01)
*H01M 4/02* (2006.01)

(52) U.S. Cl.
CPC ......... *H01M 4/623* (2013.01); *H01M 4/8828* (2013.01); *H01M 10/0525* (2013.01); *H01M 2004/021* (2013.01); *H01M 2004/028* (2013.01)

(58) Field of Classification Search
CPC ....... H01M 10/0525; H01M 2004/021; H01M 2004/028; H01M 2220/30; H01M 4/625; H01M 4/04; H01M 4/0404; H01M 4/0471; H01M 4/13; H01M 4/139; H01M 10/052; Y02E 60/50; Y02E 60/10
USPC ........................................ 429/212
See application file for complete search history.

(56) References Cited

U.S. PATENT DOCUMENTS

| | | | |
|---|---|---|---|
| 2009/0181309 A1 | 7/2009 | Kwon et al. | |
| 2013/0171516 A1* | 7/2013 | Wang ................ | H01M 4/133 429/211 |
| 2013/0193063 A1 | 8/2013 | Ng et al. | |
| 2013/0313486 A1 | 11/2013 | Sugimori et al. | |
| 2014/0001416 A1 | 1/2014 | Fiffemeier et al. | |
| 2014/0248544 A1 | 9/2014 | Xing et al. | |
| 2014/0326651 A1 | 11/2014 | Ng et al. | |
| 2015/0083975 A1 | 3/2015 | Yeou et al. | |
| 2015/0218740 A1 | 8/2015 | Ng | |
| 2016/0111724 A1 | 4/2016 | Nakamura et al. | |
| 2017/0077497 A1 | 3/2017 | Ogata et al. | |
| 2017/0338468 A1 | 11/2017 | Kim et al. | |
| 2018/0159131 A1* | 6/2018 | Seol ................ | H01M 4/13 |
| 2018/0248195 A1 | 8/2018 | Choi et al. | |
| 2018/0269485 A1 | 9/2018 | Yoo et al. | |

FOREIGN PATENT DOCUMENTS

| | | |
|---|---|---|
| CN | 107681157 A | 2/2018 |
| JP | 2010129169 A | 6/2010 |
| JP | 2014203804 A | 10/2014 |
| JP | 2015053165 A | 3/2015 |
| JP | 2015105213 A | 6/2015 |
| JP | 2016048698 A | 4/2016 |
| JP | 2016190772 A | 11/2016 |
| JP | 2017008475 A | 1/2017 |
| JP | 2017-084759 A | 5/2017 |
| JP | 2017084759 A | 5/2017 |
| KR | 20070027438 A | 3/2007 |
| KR | 20090078656 A | 7/2009 |
| KR | 20130132550 A | 12/2013 |
| KR | 20140079702 A | 6/2014 |
| KR | 20150033439 A | 4/2015 |
| KR | 20160066498 A | 6/2016 |
| KR | 20170033123 A | 3/2017 |
| KR | 20170037458 A | 4/2017 |
| KR | 20170063402 A | 6/2017 |
| KR | 20170084798 A | 7/2017 |
| KR | 20170098146 A | 8/2017 |
| KR | 20170118968 A | 10/2017 |
| KR | 20170127240 A | 11/2017 |
| KR | 20180033746 A | 4/2018 |
| WO | 2012114590 A1 | 8/2012 |
| WO | 2014088070 A1 | 6/2014 |
| WO | 2015/053411 A1 | 4/2015 |
| WO | 2015053411 A1 | 4/2015 |

OTHER PUBLICATIONS

Kusumoto Chemicals Co., Ltd., Single Layer Carbon Nanotube—TUBALLTMBATT, TUBALLTMFOIL Series, 3 pages, 2017, JETI vol. 65, No. 5, 2017.
Mikhail Predtechenskiy et al., SWCNT vs MWCNT and Nanofibers. Applications in lithium-ion batteries and transparent conductive films, 3 pages, Jun. 14, 2015, Advanced Materials: TechConnect Briefs 2015, 115.
A. V. Krestinin et al., Characterization of SWCNT Products Manufactured in Russia and the Prospects for Their Industrial Application, 12 pages, Apr. 9, 2015, Nanotechnologies in Russia, vol. 10, Nos. 7-8, 2015.
Extended European Search Report including Written Opinion for Application No. 19781670.5 dated Mar. 19, 2021, 7 pages.
Predtechenskiy, M. et al., " SWCNT vs MWCNT and Nanofibers. Applications in Lithium-Ion Batteries and Transparent Conductive Films" TechConnect Briefs 2015, Advanced Materials, Jun. 2015, pp. 115-117, vol. 115, ISBN: 978-1-4987-4727-1.
Krestinin, A.V. et al., "Characterization of SWCNT Products Manufactured in Russia and the Prospects for Their Industrial Application" Nanotechnologies in Russia, Springer Link, Apr. 2015, pp. 537-548, vol. 10, Nos. 7-8.
Kusumoto K. Co., Ltd. " Single Layer Carbon Nanotube TUBALL TM BATT, TUBALL TM FOIL Series" JETI, May 2017, pp. 51-53, vol. 65, No. 5.
Third Party Observation for European Application No. 19781670.5, dated Jan. 4, 2023, pp. 1-7.
Search Report dated Dec. 30, 2022 from the Office Action for Chinese Application No. 201980024445.4 dated Jan. 6, 2023, pp. 1-2. [See p. 1, categorizing the cited references].
Chen, Q. et al., " Aggregation behavior of single-walled carbon nanotubes in dilute aqueous suspension" Journal of Colloid and Interface Science, Elsevier, Sep. 2004, pp. 91-97, vol. 280, Issue 1.
Kawasaki, S. " Physical and chemical modification and material evaluation of single-walled carbon nanotubes" 30th Tokai young ceramist meeting, 2004 autumn conference, pp. 1-16.

* cited by examiner

ELECTRODE, SECONDARY BATTERY INCLUDING THE ELECTRODE, AND METHOD OF PREPARING THE ELECTRODE

CROSS-REFERENCE TO RELATED APPLICATIONS

This application is a national phase entry under 35 U.S.C. § 371 of International Application No. PCT/KR2019/004127, filed Apr. 8, 2019, which claims the benefit of Korean Patent Application Nos. 10-2018-0040574, filed Apr. 6, 2018, and 10-2019-0040100, filed Apr. 5, 2019, the disclosures of which are incorporated herein by reference.

TECHNICAL FIELD

The present invention relates to an electrode, a secondary battery including the same, and a method of preparing the electrode, wherein the electrode includes an electrode active material layer, the electrode active material layer includes an electrode active material; polyvinylidene fluoride; and a conductive agent, the conductive agent includes a carbon nanotube structure in which 2 to 5,000 single-walled carbon nanotube units are bonded to each other, and the carbon nanotube structure may be included in an amount of 0.01 wt % to 0.5 wt % in the electrode active material layer.

BACKGROUND ART

A typical example of an electrochemical device using electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator. The positive electrode and the negative electrode each are generally composed of an electrode current collector and an electrode active material layer formed on the electrode current collector, wherein the electrode active material layer is prepared by coating the electrode current collector with an electrode slurry composition including an electrode active material, a conductive agent, and a binder, drying, and then rolling the coated electrode current collector.

Conventionally, a point-type conductive agent, such as carbon black, has mainly been used as the conductive agent for a secondary battery, but, with respect to the point-type conductive agent, there is a limitation in that an effect of improving electrical conductivity is not sufficient. In order to address the limitation, studies on the application of a line-type conductive agent, such as a carbon nanotube (CNT) or a carbon nanofiber (CNF), and a plane-type conductive agent, such as graphene, have been actively conducted.

However, with respect to the line-type conductive agent such as a carbon nanotube or a carbon nanofiber, electrical conductivity is excellent, but, since dispersibility in the slurry is low due to the nature of the material itself growing in a bundle type or entangled type, there is a limitation in that coatability and processability are poor and the line-type conductive agent is not uniformly distributed in the electrode active material layer. In order to address this limitation, attempts have been made to improve the dispersibility by introducing a functional group to the line-type conductive agent, but, in this case, since a surface side reaction occurs due to the presence of the functional group, electrochemical properties may be deteriorated.

Even with respect to the plane-type conductive agent such as graphene, electrical conductivity is excellent, but it may be difficult to prepare thin single layer graphene, and, in a case in which thick graphene is used, battery efficiency may be reduced. Also, with respect to the plane-type conductive agent, electrolyte solution mobility may be limited in the battery due to a wide planar contact.

Thus, there is a need to develop an electrode in which a conductive agent capable of being uniformly distributed in the electrode as well as having excellent electrical conductivity is used.

DISCLOSURE OF THE INVENTION

Technical Problem

An aspect of the present invention provides an electrode, in which electrical conductivity of the electrode and input characteristics and output characteristics of a battery may be improved due to uniform dispersion of a conductive agent in the entire electrode, and life characteristics of the battery may be improved due to excellent electrode adhesion, and a method of preparing the electrode.

Another aspect of the present invention provides a secondary battery including the electrode.

Technical Solution

According to an aspect of the present invention, there is provided an electrode including an electrode active material layer, wherein the electrode active material layer includes an electrode active material; polyvinylidene fluoride; and a conductive agent, wherein the conductive agent includes a carbon nanotube structure in which 2 to 5,000 single-walled carbon nanotube units are bonded to each other, and the carbon nanotube structure is included in an amount of 0.01 wt % to 0.5 wt % in the electrode active material layer.

According to another aspect of the present invention, there is provided a method of preparing an electrode which includes: preparing a mixture by adding bundle type single-walled carbon nanotubes and polyvinylidene fluoride to a dispersion medium; preparing a conductive agent dispersion including a carbon nanotube structure, in which 2 to 5,000 single-walled carbon nanotube units are bonded to each other, by sonication of the mixture; and forming an electrode slurry including the conductive agent dispersion and an electrode active material, wherein the carbon nanotube structure is included in an amount of 0.01 wt % to 0.5 wt % in a solid content of the electrode slurry.

According to another aspect of the present invention, there is provided a secondary battery including the electrode.

Advantageous Effects

Since an electrode according to the present invention is prepared by using a conductive agent dispersion in which bundle-type single-walled carbon nanotubes were appropriately dispersed with polyvinylidene fluoride, carbon nanotube structures in the form of a rope (long fiber form) are interconnected in the electrode to form a network structure. Particularly, since the network structure may be formed to enable conductive connection between electrode active materials in the form of a secondary particle (relatively long distance) as well as conductive connection between primary particles in the electrode active material, a conductive path may be effectively formed in the electrode. Accordingly, electrical conductivity in the electrode may be significantly improved even with a very small amount of the conductive agent. Also, since an electrode active material layer is firmly fixed by the carbon nanotube structures constituting the network structure, an effect of improving electrode adhesion is achieved.

Furthermore, when an electrode slurry includes the carbon nanotube structures, powder resistance of the electrode slurry is reduced in comparison to a conventional case, and, as a result, an effect of reducing electrode resistance may be obtained.

In a case in which the above-described electrode is used in a secondary battery, excellent effects may be obtained in terms of electrochemical performance and life characteristics of the battery.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1A:
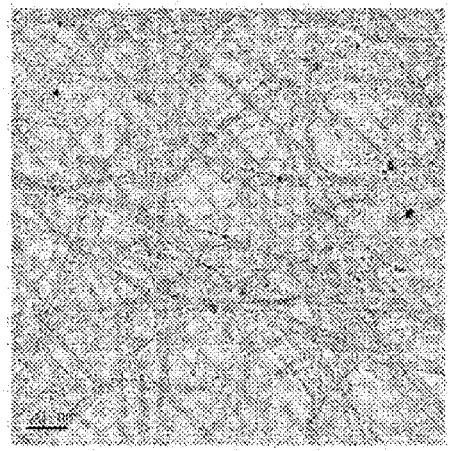
FIGS. 1(a) and 1(b) are transmission electron microscope (TEM) images of Preparation Example 1 and FIGS. 1(c) and 1(d) are TEM images of Preparation Example 4.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

In the present specification, the expression "specific surface area" is measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

Hereinafter, the present invention will be described in detail.

Electrode

An electrode according to the present invention includes an electrode active material layer, wherein the electrode active material layer includes an electrode active material; polyvinylidene fluoride; and a conductive agent, wherein the conductive agent includes a carbon nanotube structure in which 2 to 5,000 single-walled carbon nanotube units are bonded to each other, and the carbon nanotube structure may be included in an amount of 0.01 wt % to 0.5 wt % in the electrode active material layer.

The electrode may include an electrode active material layer. The electrode may further include a current collector, and, in this case, the electrode active material layer may be disposed on one surface or both surfaces of the current collector.

The current collector is not particularly limited as long as it has conductivity without causing adverse chemical changes in the battery, and, for example, copper, stainless steel, aluminum, nickel, titanium, alloys thereof, these materials that are surface-treated with one of carbon, nickel, titanium, silver, or the like, or fired carbon may be used. The current collector may typically have a thickness of 3 μm to 500 μm, and microscopic irregularities may be formed on the surface of the collector to improve the adhesion of a negative electrode active material. Also, the electrode collector, for example, may be used in various shapes such as that of a film, a sheet, a foil, a net, a porous body, a foam body, a non-woven fabric body, and the like.

The electrode active material layer may include an electrode active material; polyvinylidene fluoride; and a conductive agent.

The electrode active material may be a positive electrode active material or negative electrode active material commonly used in the art, but types thereof are not particularly limited.

For example, as the positive electrode active material, a lithium oxide including lithium and at least one metal such as cobalt, manganese, nickel, or aluminum may be used. Specifically, the lithium oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where $0<Y1<1$), $LiMn_{2-Z1}Ni_{Z1}O_4$ (where $0<Z1<2$), etc.), lithium-nickel-cobalt-based oxide (e.g., $LiNi_{1-Y2}Co_{Y2}O_2$ (where $0<Y2<1$), lithium-manganese-cobalt-based oxide (e.g., $LiCo_{1-Y3}Mn_{Y3}O_2$ (where $0<Y3<1$), $LiMn_{2-Z2}Co_{Z2}O_4$ (where $0<Z2<2$), etc.), lithium-nickel-cobalt-manganese-based oxide (e.g., $Li(Ni_{P1}Co_{Q1}Mn_{R1})O_2$ (where $0<P1<1$, $0<Q1<1$, $0<R1<1$, and $P1+Q1+R1=1$) or $Li(Ni_{P2}Co_{Q2}Mn_{R2})O_4$ (where $0<P2<2$, $0<Q2<2$, $0<R2<2$, and $P2+Q2+R2=2$), etc.), or lithium-nickel-cobalt-manganese-transition metal (M) oxide (e.g., $Li(Ni_{P3}Co_{Q3}Mn_{R3}M^1_s)O_2$ (where $M^1$ is selected from the group consisting of aluminum (Al), copper (Cu), iron (Fe), vanadium (V), chromium (Cr), titanium (Ti), zirconium (Zr), zinc (Zn), tantalum (Ta), niobium (Nb), magnesium (Mg), boron (B), tungsten (W), and molybdenum (Mo), and P3, Q3, R3, and S are atomic fractions of each independent elements, wherein 0<P3<1, 0<Q3<1, 0<R3<1, 0<S<1, and P3+Q3+R3+S=1), etc.), and any one thereof or a compound of two or more thereof may be included.

The negative electrode active material, for example, may include a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_v(0<v<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material.

The above-described electrode active material may be included in an amount of 70 wt % to 99.5 wt %, for example, 80 wt % to 99 wt % based on a total weight of the electrode active material layer. When the amount of the electrode active material satisfies the above range, excellent energy density, electrode adhesion, and electrical conductivity may be achieved.

The conductive agent may include a carbon nanotube structure.

The carbon nanotube structure may include a plurality of single-walled carbon nanotube units. Specifically, the carbon nanotube structure may be a carbon nanotube structure in which 2 to 5,000 single-walled carbon nanotube units are bonded to each other, and, more specifically, the carbon nanotube structure may be a carbon nanotube structure in which 2 to 4,500 single-walled carbon nanotube units are bonded to each other. More specifically, in consideration of dispersibility of the carbon nanotube structure and durability of the electrode, the carbon nanotube structure is most preferably a carbon nanotube structure in which 2 to 50 single-walled carbon nanotube units are bonded to each other.

The single-walled carbon nanotube units may be arranged side by side and bonded in the carbon nanotube structure (cylindrical structure having flexibility in which the units are bonded such that long axes of the units are parallel to each other) to form the carbon nanotube structure. The carbon nanotube structures are interconnected in the electrode to form a network structure.

Typical electrodes including carbon nanotubes are generally prepared by preparing a conductive agent dispersion by dispersing bundle type or entangled type carbon nanotubes (form in which single-walled carbon nanotube units or multi-walled carbon nanotube units are attached or entangled with each other) in a dispersion medium and then using the conductive dispersion. In this case, since the carbon nanotubes are fully dispersed in the typical conductive agent dispersion, the carbon nanotubes are present as the conductive agent dispersion in which single-stranded carbon nanotube units are dispersed. With respect to the typical conductive agent dispersion, since the carbon nanotube units are easily cut by an excessive dispersion process, the carbon nanotube units have a length shorter than an initial length. Also, the carbon nanotube units may also be easily cut during a rolling process of the electrode, and the carbon nanotube unit may additionally be cut due to changes in volume of the electrode active material during operation of the battery. Accordingly, since conductivity of the electrode is reduced, input characteristics, output characteristics, and life characteristics of the battery may be degraded. Furthermore, with respect to the multi-walled carbon nanotube units, structural defects are high due to a mechanism in which nodes grow (the units are not smooth and linear, but the nodes are present due to defects generated during the growth process). Thus, the multi-walled carbon nanotube units are more easily cut in the dispersion process, and the short-cut multi-walled carbon nanotube units may be easily aggregated by π-π stacking caused by carbon of the unit. Accordingly, it is more difficult for the multi-walled carbon nanotube units to be more uniformly dispersed in an electrode slurry.

Alternatively, with respect to the carbon nanotube structure included in the electrode of the present invention, since the carbon nanotube structure is in the form in which 2 to 5,000 single-walled carbon nanotube units maintaining relatively high crystallinity without structural defects are bonded together side by side, the single-walled carbon nanotube units may not be cut even during the operation of the battery and their length may be smoothly maintained. Thus, the conductivity of the electrode may be maintained. Also, since the conductivity of the electrode is increased due to high conductivity of the single-walled carbon nanotube unit having high crystallinity, the input characteristics, output characteristics, and life characteristics of the battery may be significantly improved. Furthermore, since the carbon nanotube structures are interconnected in the electrode to have a network structure, an excessive change in the volume of the electrode active material may be suppressed, a strong conductive path may be secured at the same time, and electrode adhesion may be significantly improved by inhibiting deintercalation of the electrode active material.

In the carbon nanotube structure, the single-walled carbon nanotube unit may have an average diameter of 0.5 nm to 10 nm, particularly 1 nm to 9 nm, and more particularly 1 nm to 6 nm. When the average diameter is satisfied, conductivity in the electrode may be maximized even with a very small amount of the conductive agent. The average diameter corresponds to an average value of top 100 single-walled carbon nanotubes with a larger average diameter and bottom 100 single-walled carbon nanotubes when the prepared electrode is observed by a transmission electron microscope (TEM).

In the carbon nanotube structure, the single-walled carbon nanotube unit may have an average length of 1 μm to 100 μm, for example, 5 μm to 50 μm. When the average length is satisfied, since a long conductive path for conductive connection between the electrode active materials may be formed and a unique network structure may be formed, the conductivity in the electrode may be maximized even with a very small amount of the conductive agent. The average length corresponds to an average value of top 100 single-walled carbon nanotubes with a larger average length and bottom 100 single-walled carbon nanotubes when the prepared electrode is observed by a TEM.

The single-walled carbon nanotube unit may have a specific surface area of 500 $m^2/g$ to 1,000 $m^2/g$, for example, 600 $m^2/g$ to 800 $m^2/g$. When the specific surface area satisfies the above range, since the conductive path in the electrode may be smoothly secured by the wide specific surface area, the conductivity in the electrode may be maximized even with a very small amount of the conductive agent. The specific surface area of the single-walled carbon nanotube unit may specifically be calculated from a nitrogen gas adsorption amount at a liquid nitrogen temperature (77K) using BELSORP-mini II by Bell Japan Inc.

The carbon nanotube structure may have an average diameter of 1 nm to 300 nm, for example, 3 nm to 150 nm. When the average diameter satisfies the above range, since it is effective in forming a conductive network structure and is advantageous in connecting the active materials, excellent electrical conductivity may be achieved. The average diameter corresponds to an average value of diameters of top 100 single-walled carbon nanotubes with a larger average diameter and bottom 100 single-walled carbon nanotubes when the prepared electrode is observed by a scanning electron microscope (SEM).

The carbon nanotube structure may have an average length of 1 μm to 100 μm, for example, 5 μm to 50 μm. When the average length satisfies the above range, since it is effective in forming the conductive network structure and is advantageous in connecting the active materials, excellent electrical conductivity may be achieved. The average length corresponds to an average value of lengths of top 100 single-walled carbon nanotubes with a larger average length and bottom 100 single-walled carbon nanotubes when the prepared electrode is observed by an SEM.

The carbon nanotube structure may be included in an amount of 0.01 wt % to 0.5 wt % in the electrode active material layer, and may specifically be included in an amount of 0.02 wt % to 0.2 wt %. When the amount of the carbon nanotube structure satisfies the above range, since the conductive path in the electrode may be secured, the life characteristics of the battery may be improved while electrode resistance is maintained at a low level. In a case in which the bundle type carbon nanotubes are fully dispersed (as a typical dispersion method in which the carbon nanotubes are dispersed so that single-stranded carbon nanotube units are separated from each other as much as possible) when the conductive agent dispersion is prepared, the carbon nanotube structure is not generated, or is generated in a very small amount (for example, 0.0005 wt %) even if it is unintentionally generated. That is, the above amount range may never be achieved in the usual way.

With respect to a prior art in which an electrode includes a multi-walled carbon nanotube unit, a large amount (for example, greater than 0.5 wt %) of the multi-walled carbon nanotube unit has to be used to compensate for low conductivity of the multi-walled carbon nanotube unit. Also, in a case in which an electrode is prepared by using a conductive agent dispersion in which single-walled carbon nanotube units are fully dispersed, a small amount of the single-walled carbon nanotube units may not be used due to a limitation where the single-walled carbon nanotube units are cut.

In contrast, the carbon nanotube structure included in the electrode of the present invention is in the form in which 2 to 5,000 single-walled carbon nanotube units are bonded together side by side. Thus, since the single-walled carbon nanotube units may not be cut even during the operation of the battery and their length may be smoothly maintained, the conductivity of the electrode may be maintained and the conductivity of the electrode may be smoothly secured due to the high conductivity of the single-walled carbon nanotube unit. Accordingly, the input characteristics, output characteristics, and life characteristics of the battery may be excellent even if the amount of the carbon nanotube structure in the electrode is low.

Although it is not required, the single-walled carbon nanotube unit may be surface-treated through an oxidation treatment or nitridation treatment to improve affinity of polyvinylidene fluoride.

The polyvinylidene fluoride may be a substance that starts to be included in the electrode from the conductive agent dispersion necessary for the preparation of the electrode slurry (in some cases, the polyvinylidene fluoride may be further added to reinforce a binder function during the preparation of the electrode slurry). The polyvinylidene fluoride helps to facilitate the dispersion of the bundle-type carbon nanotubes in the conductive agent dispersion.

The polyvinylidene fluoride may have a weight-average molecular weight of 10,000 g/mol to 1,000,000 g/mol, for example, 100,000 g/mol to 900,000 g/mol. In a case in which the weight-average molecular weight satisfies the above range, since the polyvinylidene fluoride may easily penetrate between the single-walled carbon nanotube units in the bundle type carbon nanotubes, the bundle type carbon nanotubes may be appropriately dispersed and phase stability of the conductive agent dispersion may be improved.

The polyvinylidene fluoride may be included in an amount of 0.1 wt % to 10.0 wt %, particularly 0.2 wt % to 5.0 wt %, and more particularly 0.2 wt % to 2.5 wt % in the electrode active material layer. In a case in which the amount of the polyvinylidene fluoride satisfies the above range, the carbon nanotube structures are uniformly dispersed, energy density of the electrode is high, and the electrode adhesion may be excellent.

The polyvinylidene fluoride may include modified polyvinylidene fluoride which is modified with a hydrophilic functional group to improve affinity with the single-walled carbon nanotube unit. Specifically, the polyvinylidene fluoride may include modified polyvinylidene fluoride including at least one functional group selected from an acid functional group and an ester functional group. The functional groups of the modified polyvinylidene fluoride may interact with the single-walled carbon nanotube unit to further improve the electrode adhesion while improving the dispersibility of the carbon nanotube structure.

The functional group may be included in an amount of 0.1 wt % to 5 wt %, for example, 0.3 wt % to 3 wt % in the modified polyvinylidene fluoride. In a case in which the amount of the functional group satisfies the above range, the electrode adhesion may be further improved while further improving the dispersibility of the carbon nanotube structure.

The modified polyvinylidene fluoride may be included in an amount of 1 wt % to 100 wt %, particularly 1 wt % to 50 wt %, and more particularly 1 wt % to 20 wt % based on a total weight of the polyvinylidene fluoride. In a case in which the amount of the modified polyvinylidene fluoride satisfies the above range, the electrode adhesion may be further improved while further increasing the dispersibility of the carbon nanotube structure.

The electrode active material layer may further include a binder. The binder is for securing adhesion between the electrode active materials and adhesion of the electrode active material to the current collector, wherein common binders used in the art may be used, and types thereof are not particularly limited. The binder, for example, may include polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or copolymers thereof, and any one thereof or a mixture of two or more thereof may be used.

The binder may be included in an amount of 10 wt % or less, for example, 0.1 wt % to 5 wt % based on the total weight of the electrode active material layer. In a case in which the amount of the binder satisfies the above range, excellent electrode adhesion may be achieved while minimizing an increase in the electrode resistance.

The electrode of the present invention configured as described above has excellent electrode adhesion. Specifically, the electrode according to the present invention may have an adhesion measured by a 90° peel test of 20.2 gf/20 mm or more, for example, 21 gf/20 mm or more.

Method of Preparing Electrode

Next, a method of preparing the electrode of the present invention will be described.

The method of preparing the electrode of the present invention includes the steps of: (1) preparing a mixture by adding bundle type single-walled carbon nanotubes and polyvinylidene fluoride to a dispersion medium; (2) preparing a conductive agent dispersion including a carbon nanotube structure, in which 2 to 5,000 single-walled carbon nanotube units are bonded to each other, by sonication of the mixture; and (3) forming an electrode slurry including the conductive agent dispersion and an electrode active material, wherein the carbon nanotube structure is included in an amount of 0.01 wt % to 0.5 wt % in a solid content of the electrode slurry. The electrode of the above-described embodiment may be prepared by the above method.

(1) Preparing of the Mixture

The mixture may be prepared by adding bundle type carbon nanotubes and polyvinylidene fluoride to a dispersion medium. The bundle type carbon nanotubes are present in the form of a bundle in which the above-described single-walled carbon nanotube units are bonded, wherein the bundle type carbon nanotube includes usually 2 or more, substantially 500 or more, for example, 5,000 or more single-walled carbon nanotube units.

The bundle type single-walled carbon nanotubes may be included in an amount of 0.1 wt % to 1.0 wt %, for example, 0.2 wt % to 0.5 wt % in the mixture. When the amount of the bundle type single-walled carbon nanotubes satisfies the above range, since the bundle type single-walled carbon nanotubes are dispersed in an appropriate level, a carbon nanotube structure may be formed at an appropriate level and dispersion stability may be improved.

The polyvinylidene fluoride may be included in an amount of 0.1 wt % to 20 wt %, for example, 1 wt % to 10 wt % in the mixture. In a case in which the amount of the polyvinylidene fluoride satisfies the above range, since the bundle type single-walled carbon nanotubes are dispersed in an appropriate level, a carbon nanotube structure may be formed at an appropriate level and the dispersion stability may be improved.

Since the polyvinylidene fluoride is the same as the polyvinylidene fluoride of the above-described embodiment, a description thereof will be omitted.

In the conductive agent dispersion, a weight ratio of the bundle type carbon nanotubes to the polyvinylidene fluoride may be in a range of 1:0.1 to 1:10, for example, 1:1 to 1:10. In a case in which the weight ratio satisfies the above range, since the bundle type single-walled carbon nanotubes are dispersed in an appropriate level, a carbon nanotube structure may be formed at an appropriate level and the dispersion stability may be improved.

The dispersion medium, for example, may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 2-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, and ε-propiolactone, and any one thereof or a mixture of two or more thereof may be used, but the present invention is not limited thereto. Specifically, the dispersion medium may be N-methylpyrrolidone (NMP).

A solid content in the mixture may be in a range of 0.1 wt % to 20 wt %, for example, 1 wt % to 10 wt %. In a case in which the solid content in the mixture satisfies the above range, since the bundle type single-walled carbon nanotubes are dispersed in an appropriate level, a carbon nanotube structure may be formed at an appropriate level and the dispersion stability may be improved. Also, the electrode slurry may have viscosity and elasticity suitable for an electrode preparation process, and it also contributes to increase the solid content of the electrode slurry.

(2) Preparing of the Conductive Agent Dispersion

A process of dispersing the bundle type carbon nanotubes in the mixture may be performed by sonication and using a mixing device such as a homogenizer, a bead mill, a ball mill, a basket mill, an attrition mill, a universal stirrer, a clear mixer, a spike mill, or a TK mixer. Among them, the sonication is preferable. In the sonication, numerous vacuum bubbles are created by extreme vibration when high-intensity ultrasonic waves are released into a solution, and these bubbles instantaneously clump together or grow, but the bubbles are violently broken in a chainwise manner by immediately following vibration. When the continuous breakage of the bubbles is in progress, strong shock waves are generated by a vigorous flow of the solution or a swirling phenomenon, and the bundle type carbon nanotubes may be debundled by shock wave energy. The sonication enables nanoscale fine dispersion of the single-walled carbon nanotubes in the bundle type carbon nanotube without cutting in a longitudinal direction thereof. For this reason, the sonication is preferable.

The sonication may be as follows. A solid in the mixture may be dispersed by applying ultrasonic waves to the mixture.

In this case, conditions under which the sonication is performed are as follows.

The sonication may be performed at a power of 800 W to 1,500 W, and may specifically be performed at a power of 800 W to 1,200 W. The sonication may be performed for 0.5 hours to 5 hours, and may specifically be performed for 1 hour to 3 hours. When the power and performance time satisfy the above ranges, the bundle type carbon nanotubes may be appropriately separated to form the carbon nanotube structure. The performance time means total time during which the sonication is used, and, thus, for example, if the sonication is performed several times, the performance time means total time required for performing the sonication several times.

The above conditions are for forming the carbon nanotube structure in which 2 to 5,000 single-walled carbon nanotube units are bonded together side by side in the conductive agent dispersion prepared by appropriately dispersing the bundle type carbon nanotubes. This may be achieved only when a composition of the mixture and sonication conditions are strictly controlled.

(3) Forming of the Electrode Slurry

When the conductive agent dispersion is prepared through the above-described process, the conductive agent dispersion is mixed with an electrode active material to form an electrode slurry. In this case, the above-described electrode active materials may be used as the electrode active material.

Also, a binder and a solvent may be further included in the electrode slurry, if necessary. In this case, the binder of the above-described embodiment may be used as the binder. The solvent, for example, may include an amide-based polar organic solvent such as dimethylformamide (DMF), diethylformamide, dimethylacetamide (DMAc), and N-methylpyrrolidone (NMP); alcohols such as methanol, ethanol, 1-propanol, 2-propanol (isopropyl alcohol), 1-butanol (n-butanol), 2-methyl-1-propanol (isobutanol), 2-butanol (sec-butanol), 2-methyl-2-propanol (tert-butanol), pentanol, hexanol, heptanol, or octanol; glycols such as ethylene glycol, diethylene glycol, triethylene glycol, propylene glycol, 1,3-propanediol, 1,3-butanediol, 1,5-pentanediol, or hexylene glycol; polyhydric alcohols such as glycerin, trimethylolpropane, pentaerythritol, or sorbitol; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, or tetraethylene glycol monobutyl ether; ketones such as acetone, methyl ethyl ketone, methyl propyl ketone, or cyclopentanone; and esters such as ethyl acetate, γ-butyrolactone, or ε-propiolactone, and any one thereof or a mixture of two or more thereof may be used, but the present invention is not limited thereto. The solvent may be the same or different from the dispersion medium used in the pre-dispersion, and the solvent may preferably be N-methylpyrrolidone (NMP).

In this case, the electrode active material may be included in an amount of 70 wt % to 99.5 wt %, for example, 80 wt % to 99 wt % based on a total solid content in the electrode slurry. When the amount of the electrode active material satisfies the above range, excellent energy density, electrode adhesion, and electrical conductivity may be achieved.

Also, in a case in which the binder is further included, the binder may be included in an amount of 10 wt % or less, for example, 0.1 wt % to 5 wt % based on the total solid content in the electrode slurry.

A solid content in the electrode slurry may be in a range of 60 wt % to 80 wt %, for example, 65 wt % to 75 wt %. In a case in which the solid content in the electrode slurry satisfies the above range, migration of the conductive agent and the binder caused by the evaporation of the solvent may be suppressed during drying after coating of the electrode slurry, and an electrode having excellent electrode adhesion and electrical conductivity may be prepared. Furthermore, a high-quality electrode having less deformation of the electrode during rolling may be prepared.

The carbon nanotube structure may be included in an amount of 0.01 wt % to 0.5 wt % in the solid content of the electrode slurry, and may specifically be included in an amount of 0.02 wt % to 0.2 wt %. When the amount of the carbon nanotube structure satisfies the above range, since the conductive path in the electrode may be secured, the life characteristics of the battery may be improved while the electrode resistance is maintained at a low level.

Next, the electrode slurry prepared as described above is coated and dried to form an electrode active material layer. Specifically, the electrode active material layer may be prepared by a method of coating the electrode slurry on an electrode collector and drying the coated electrode collector, or may be prepared by a method of casting the electrode slurry on a separate support and then laminating a film separated from the support on the electrode collector. If necessary, the electrode active material layer is formed by the above-described method, and a rolling process may then be further performed.

In this case, the drying and the rolling may be performed under appropriate conditions in consideration of physical properties of the electrode to be finally prepared, and are not particularly limited.

Secondary Battery

Next, a secondary battery according to the present invention will be described.

The secondary battery according to the present invention includes the above-described electrode of the present invention. In this case, the electrode may be at least one of a positive electrode and a negative electrode. Specifically, the secondary battery according to the present invention may include a positive electrode, a negative electrode, a separator disposed between the positive electrode and the negative electrode, and an electrolyte, and, in this case, at least one of the positive electrode and the negative electrode may be the above-described electrode of the present invention, that is, the electrode which includes the electrode active material layer including the electrode active material and the carbon nanotube structure. Preferably, the electrode of the present invention may be the positive electrode. Since the electrode according to the present invention has been described above, a detailed description thereof will be omitted, and hereinafter, only the other components will be described.

The separator separates the negative electrode and the positive electrode and provides a movement path of lithium ions, wherein any separator may be used as the separator without particular limitation as long as it is typically used in a lithium secondary battery. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used as the separator. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

The electrolyte may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include a non-aqueous organic solvent and a metal salt.

As the non-aqueous organic solvent, for example, an aprotic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, may be used.

Particularly, among the carbonate-based organic solvents, since ethylene carbonate and propylene carbonate, as cyclic carbonate, well dissociate a lithium salt due to high permittivity as a highly viscous organic solvent, the cyclic carbonate may be preferably used. Since an electrolyte having high electrical conductivity may be prepared when the above cyclic carbonate is mixed with low viscosity, low permittivity linear carbonate, such as dimethyl carbonate and diethyl carbonate, in an appropriate ratio and used, the cyclic carbonate may be more preferably used.

A lithium salt may be used as the metal salt, and the lithium salt is a material that is readily soluble in the non-aqueous organic solvent, wherein, for example, at least one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components.

The secondary battery according to the present invention as described above has excellent electrode adhesion in comparison to a conventional secondary battery, and has excellent life characteristics at a high temperature.

Hereinafter, the present invention will be described in detail, according to specific examples.

Preparation Example 1: Preparation of Conductive Agent Dispersion 0.2 part by weight of bundle type carbon nanotubes (specific surface area of 650 m²/g) composed of single-walled carbon nanotube units having an average diameter of 1.5 nm and an average length of 5 μm and 2.0 parts by weight of polyvinylidene fluoride (weight-average molecular weight: 685,000 g/mol, standard homo-polymer) were mixed in 97.8 parts by weight of N-methylpyrrolidone (NMP), as a dispersion medium, to prepare a mixture such that a solid content was 2.2 wt %.

The bundle type carbon nanotubes were dispersed in the dispersion medium by stirring the mixture by sonication and thus, a conductive agent dispersion was prepared. In this case, the sonication was performed at a power of 1,000 W for 1.5 hours. The conductive agent dispersion included a carbon nanotube structure in the form in which 2 to 5,000 single-walled carbon nanotube units were bonded together side by side. In the conductive agent dispersion, an amount of the carbon nanotube structure was 0.2 wt %, and an amount of the polyvinylidene fluoride was 2.0 wt %.

Preparation Example 2: Preparation of Conductive Agent Dispersion

A conductive agent dispersion was prepared in the same manner as in Preparation Example 1 except that the polyvinylidene fluoride was modified polyvinylidene fluoride (weight-average molecular weight: 880,000 g/mol) including an acid functional group in an amount of 2.1 wt %.

Preparation Example 3: Preparation of Conductive Agent Dispersion 4.0 parts by weight of bundle type carbon nanotubes (specific surface area of 185 m²/g) composed of multi-walled carbon nanotube units having an average diameter of 10 nm and an average length of 1 μm and 0.8 part by weight of modified polyvinylidene fluoride (weight-average molecular weight: 880,000 g/mol) including an acid functional group in an amount of 2.1 wt % were mixed in 95.2 parts by weight of N-methylpyrrolidone (NMP), as a dispersion medium, to prepare a mixture such that a solid content was 4.8 wt %.

The bundle type carbon nanotubes were dispersed in the dispersion medium by stirring the mixture by sonication and thus, a conductive agent dispersion was prepared. In this case, the sonication was performed at a power of 1,000 W for 1.5 hours. In the conductive agent dispersion, an amount of the multi-walled carbon nanotube units was 4.0 wt %, and an amount of the polyvinylidene fluoride was 0.8 wt %.

Preparation Example 4: Preparation of Conductive Agent Dispersion 0.2 part by weight of bundle type carbon nanotubes (specific surface area of 650 m²/g) composed of single-walled carbon nanotube units having an average diameter of 1.5 nm and an average length of 5 μm and 4.0 parts by weight of polyvinylidene fluoride (weight-average molecular weight: 220,000 g/mol, standard homo-polymer) were mixed in 95.8 parts by weight of N-methylpyrrolidone (NMP), as a dispersion medium, to prepare a mixture such that a solid content was 4.2 wt %.

The bundle type carbon nanotubes were dispersed in the dispersion medium by stirring the mixture by sonication and thus, a conductive agent dispersion was prepared. In this case, the sonication was performed at a power of 2,000 W for 5 hours.

In the conductive agent dispersion, an amount of the bundle type carbon nanotubes was 0.2 wt %, and an amount of the polyvinylidene fluoride was 4.0 wt %.

Figure 1B:
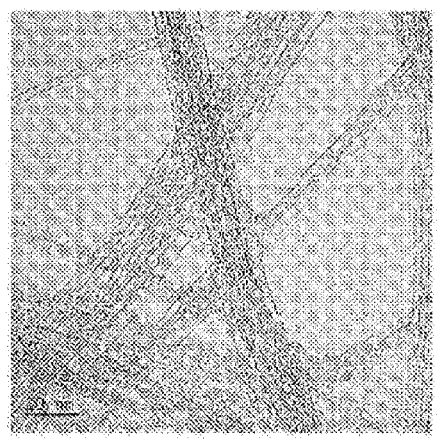
Figure 1C:
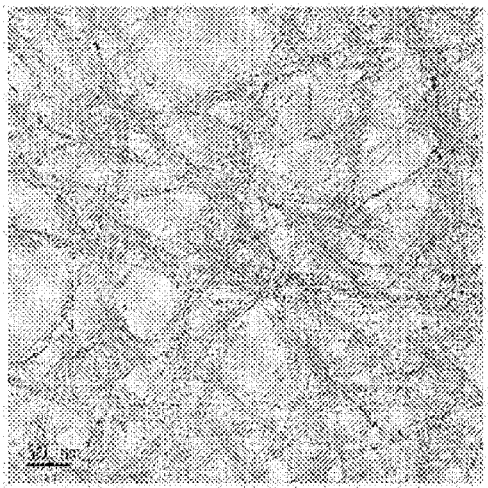
Figure 1D:
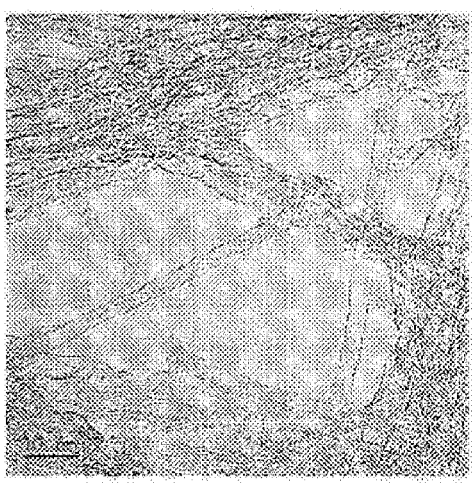

Referring to FIG. 1(a) and FIG. 1(b), in the conductive agent dispersion of Preparation Example 1, the carbon nanotube structure, in which 2 to 5,000 single-walled carbon nanotube units were bonded together side by side, was present while it constituted most of the conductive agent. In contrast, in the conductive agent dispersion of Preparation Example 4, it may be understood that most of the single-walled carbon nanotube units were present as a single strand (see FIG. 1(c) and FIG. 1(d).

EXAMPLES AND COMPARATIVE EXAMPLES

Example 1: Preparation of Positive Electrode $LiNi_{0.6}Co_{0.2}Mn_{0.2}O_2$ (NCM622) and modified polyvinylidene fluoride (modified PVDF, KF9700, weight-average molecular weight: 880,000 g/mol, 2.1 wt % of acid functional group was included) were added to the conductive agent dispersion of Preparation Example 1, and N-methylpyrrolidone (NMP) was further added thereto to prepare a positive electrode slurry in which a solid content was 70.1 wt %. The positive electrode slurry was coated on a 20 μm thick aluminum (Al) thin film current collector, dried at 130° C., and then rolled to prepare a positive electrode including a positive electrode active material layer.

97.6 wt % of the $LiNi_{0.6}Co_{0.2}Mn_{0.2}O_2$ (NCM622), 2.3 wt % of the polyvinylidene fluoride, and 0.1 wt % of the carbon nanotube structure were included in the positive electrode active material layer. An amount of the modified polyvinylidene fluoride was 1.8 wt % based on a total weight of the polyvinylidene fluoride.

Example 2: Preparation of Positive Electrode

A positive electrode was prepared in the same manner as in Example 1 except that the conductive agent dispersion of Preparation Example 2 was used instead of the conductive agent dispersion of Preparation Example 1. All the polyvinylidene fluoride included in the positive electrode was modified polyvinylidene fluoride.

Example 3: Preparation of Positive Electrode $LiNi_{0.6}Co_{0.2}Mn_{0.2}O_2$ (NCM622) and modified polyvinylidene fluoride (modified PVDF, KF9700, weight-average molecular weight: 880,000 g/mol, 2.1 wt % of acid functional group was included) were added to the conductive agent dispersion of Preparation Example 2, and N-methylpyrrolidone (NMP) was further added thereto to prepare a positive electrode slurry in which a solid content was 70.1 wt %. The positive electrode slurry was coated on a 20 μm thick Al thin film current collector, dried at 130° C., and then rolled to prepare a positive electrode including a positive electrode active material layer.

97.9 wt % of the $LiNi_{0.6}Co_{0.2}Mn_{0.2}O_2$ (NCM622), 2.05 wt % of the polyvinylidene fluoride, and 0.05 wt % of the carbon nanotube structure were included in the positive electrode active material layer. All the polyvinylidene fluoride included in the positive electrode was modified polyvinylidene fluoride.

Comparative Example 1: Preparation of Positive Electrode (1) Preparation of Conductive Agent Dispersion Carbon black having a specific surface area of 240 m²/g and modified polyvinylidene fluoride (modified PVDF, KF9700, weight-average molecular weight: 880,000 g/mol, 2.1 wt % of acid functional group was included) were mixed in N-methylpyrrolidone (NMP) to prepare a mixture such that a solid content was 72.0 wt %.

The carbon black was dispersed in the dispersion medium by stirring the mixture by sonication and thus, a conductive agent dispersion was prepared. In this case, the sonication was performed at a power of 1,000 W for 1.5 hours. In the conductive agent dispersion, an amount of the carbon black was 15 wt %, and an amount of the modified polyvinylidene fluoride was 1.5 wt %.

(2) Preparation of Positive Electrode $LiNi_{0.6}Co_{0.2}Mn_{0.2}O_2$ (NCM622) and modified polyvinylidene fluoride (modified PVDF, KF9700, weight-average molecular weight: 880,000 g/mol, 2.1 wt % of acid functional group was included) were added to the conductive agent dispersion, and N-methylpyrrolidone (NMP) was further added thereto to prepare a positive electrode slurry in which a solid content was 72.0 wt %. The positive electrode slurry was coated on a 20 μm thick Al thin film current collector, dried at 130° C., and then rolled to prepare a positive electrode including a positive electrode active material layer.

96.35 wt % of the $LiNi_{0.6}Co_{0.2}Mn_{0.2}O_2$ (NCM622), 2.15 wt % of the modified polyvinylidene fluoride, and 1.5 wt % of the carbon black were included in the positive electrode active material layer.

Comparative Example 2: Preparation of Positive Electrode $LiNi_{0.6}Co_{0.2}Mn_{0.2}O_2$ (NCM622) and modified polyvinylidene fluoride (modified PVDF, KF9700, weight-average molecular weight: 880,000 g/mol, 2.1 wt % of acid functional group was included) were added to the conductive agent dispersion of Preparation Example 3, and N-methylpyrrolidone (NMP) was further added thereto to prepare a positive electrode slurry in which a solid content was 72.1 wt %. The positive electrode slurry was coated on a 20 μm thick Al thin film current collector, dried at 130° C., and then rolled to prepare a positive electrode including a positive electrode active material layer.

97.48 wt % of the $LiNi_{0.6}Co_{0.2}Mn_{0.2}O_2$ (NCM622), 1.92 wt % of the polyvinylidene fluoride, and 0.6 wt % of the multi-walled carbon nanotube units were included in the positive electrode active material layer.

Comparative Example 3: Preparation of Positive Electrode $LiNi_{0.6}Co_{0.2}Mn_{0.2}O_2$ (NCM622) and modified polyvinylidene fluoride (modified PVDF, KF9700, weight-average molecular weight: 880,000 g/mol, 2.1 wt % of acid functional group was included) were added to the conductive agent dispersion of Preparation Example 3, and N-methylpyrrolidone (NMP) was further added thereto to prepare a positive electrode slurry in which a solid content was 72.0 wt %. The positive electrode slurry was coated on a 20 μm thick Al thin film current collector, dried at 130° C., and then rolled to prepare a positive electrode including a positive electrode active material layer.

97.04 wt % of the $LiNi_{0.6}Co_{0.2}Mn_{0.2}O_2$ (NCM622), 2.16 wt % of the polyvinylidene fluoride, and 0.8 wt % of the multi-walled carbon nanotube units were included in the positive electrode active material layer.

Comparative Example 4: Preparation of Positive Electrode

A positive electrode was prepared in the same manner as in Example 3 except that the conductive agent dispersion of Preparation Example 4 was used instead of the conductive agent dispersion of Preparation Example 2. 97.9 wt % of the $LiNi_{0.6}Co_{0.2}Mn_{0.2}O_2$ (NCM622), 2.05 wt % of the polyvinylidene fluoride, and 0.05 wt % of the carbon nanotube structure were included in the positive electrode active material layer. An amount of the modified polyvinylidene fluoride was 2.05 wt % based on a total weight of the polyvinylidene fluoride.

Experimental Example 1: Observation of Positive Electrode

The active material layers of the positive electrodes prepared by Examples 1 to 3 and Comparative Examples 1 to 4 were observed by a scanning electron microscope (SEM). SEM images taken from the electrodes of Examples 1 to 3 (in sequence) are illustrated in FIGS. 2 to 4, respectively, and SEM images taken from the electrodes of Comparative Examples to 4 (in sequence) are illustrated in FIGS. 5 to 8, respectively.

Figure 2:
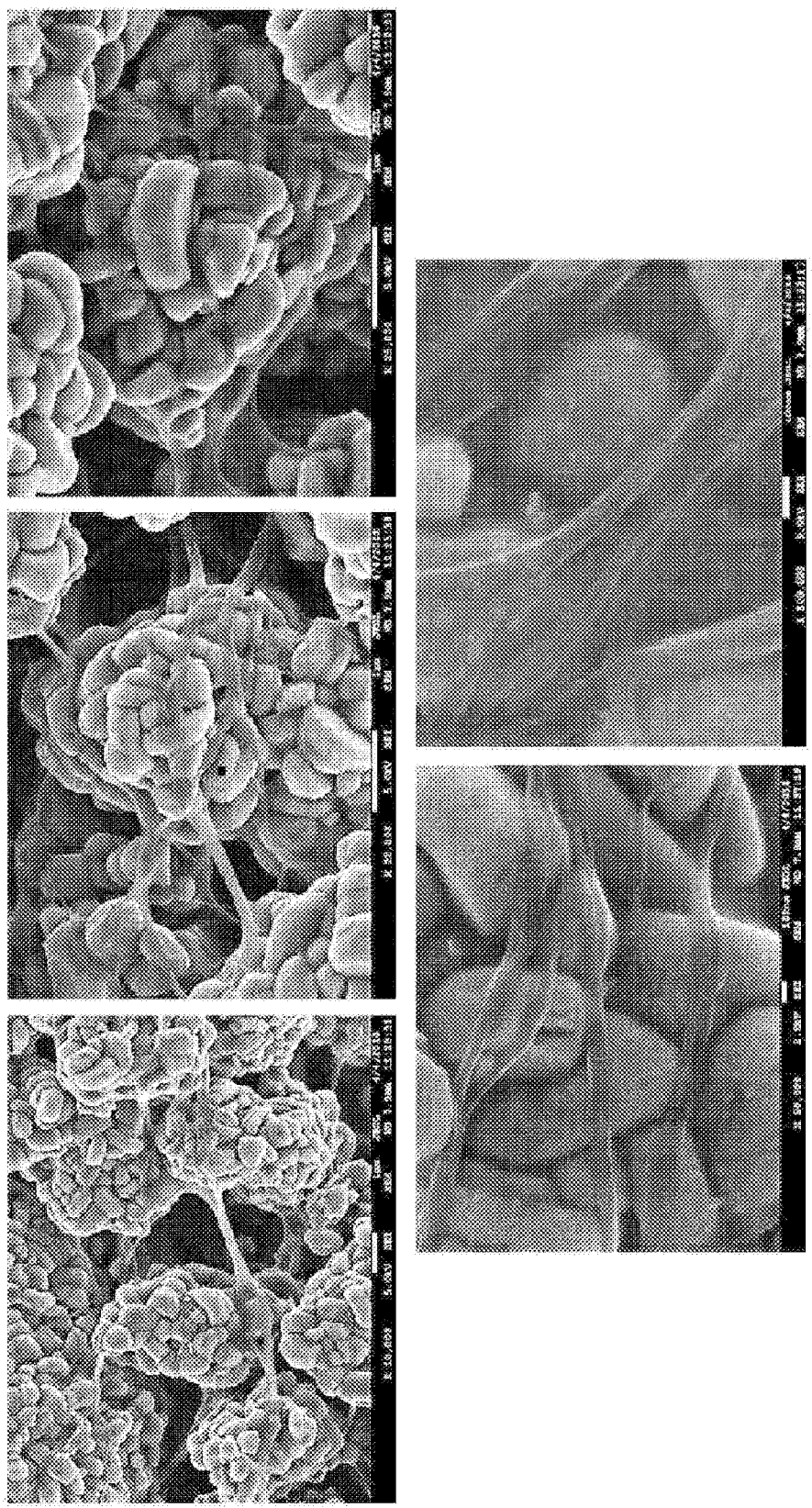
FIG. 2 is scanning electron microscope (SEM) images taken from an electrode of Example 1.
Figure 3:
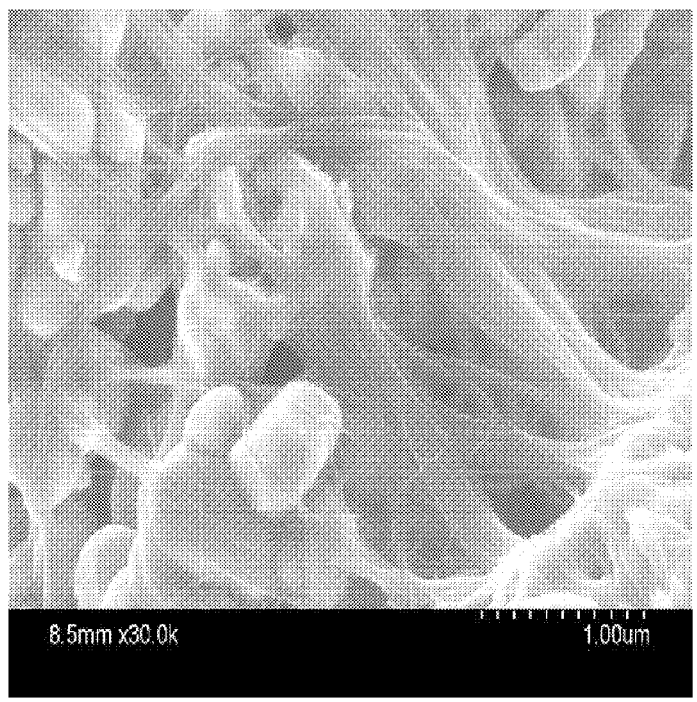
FIG. 3 is an SEM image taken from an electrode of Example 2.
Figure 4:
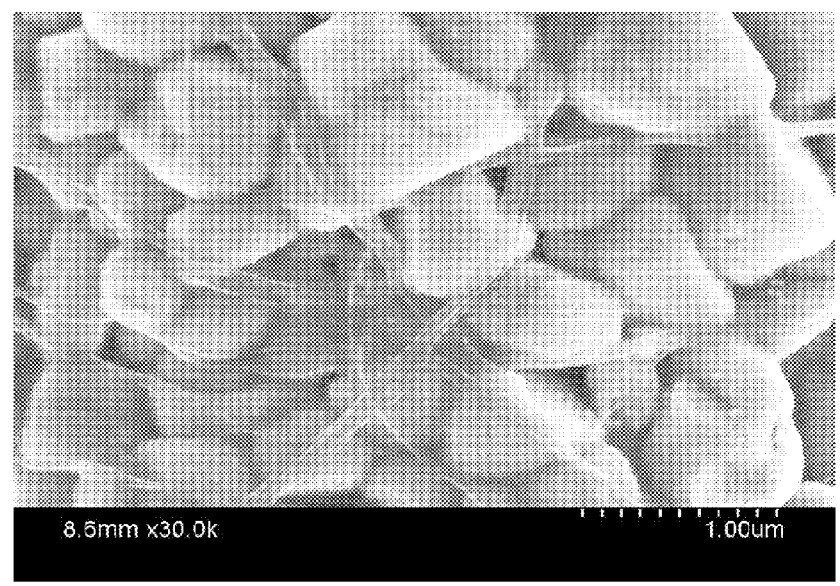
FIG. 4 is an SEM image taken from an electrode of Example 3.
Figure 5:
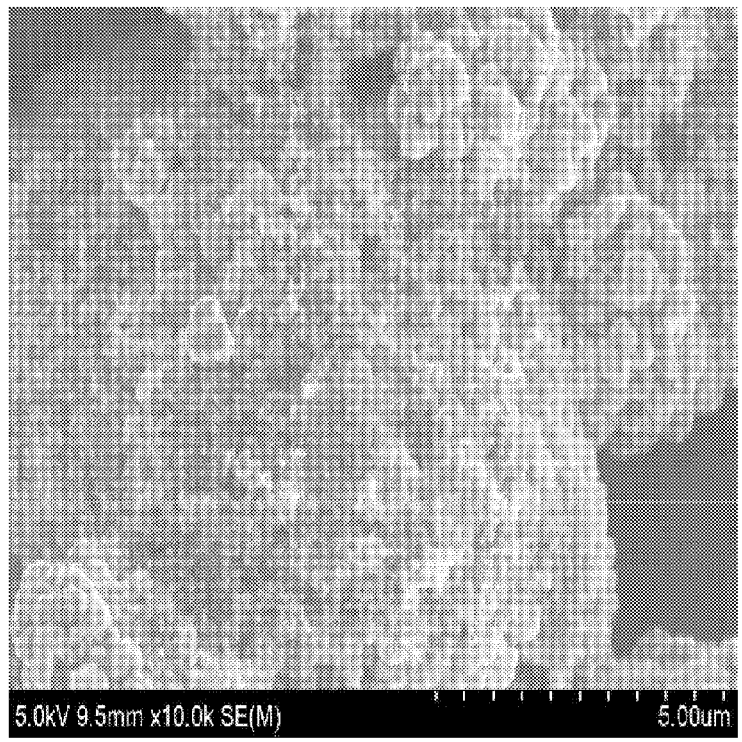
FIG. 5 is an SEM image taken from an electrode of Comparative Example 1.
Figure 6:
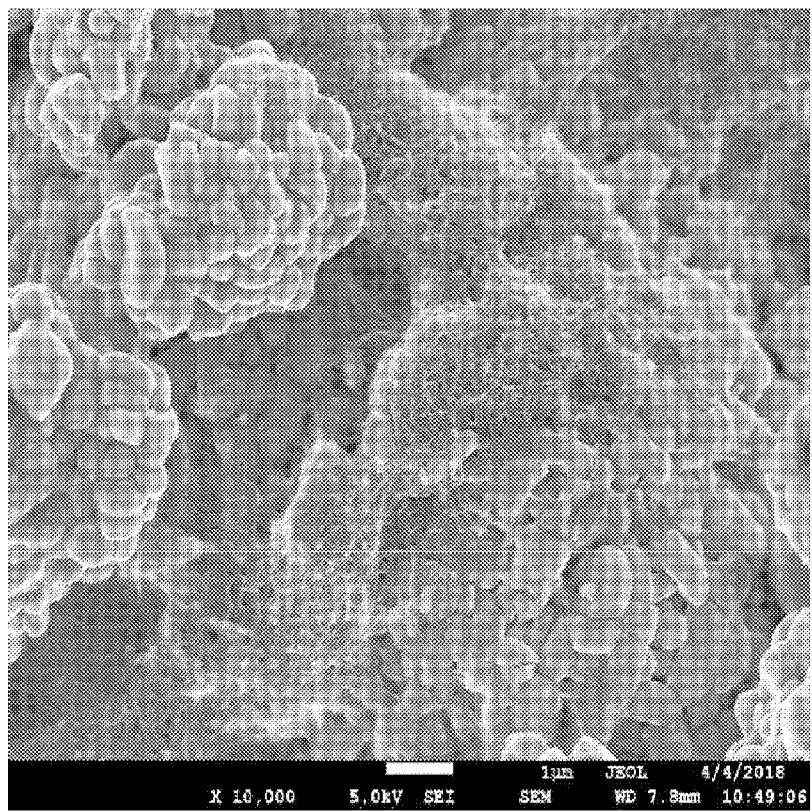
FIG. 6 is an SEM image taken from an electrode of Comparative Example 2.
Figure 7:
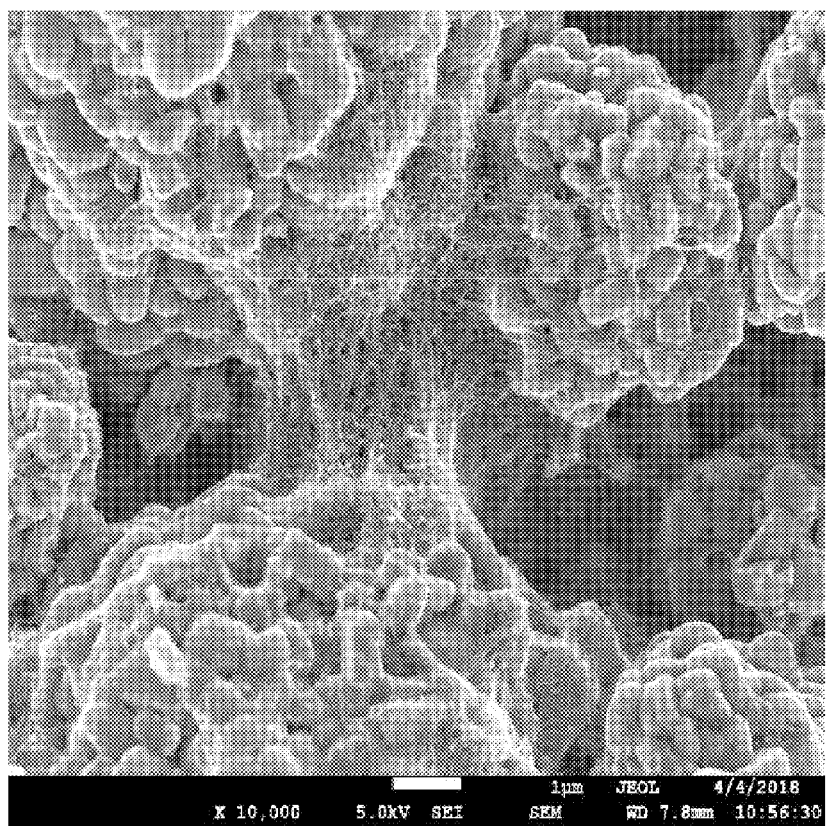
FIG. 7 is an SEM image taken from an electrode of Comparative Example 3.
Figure 8:
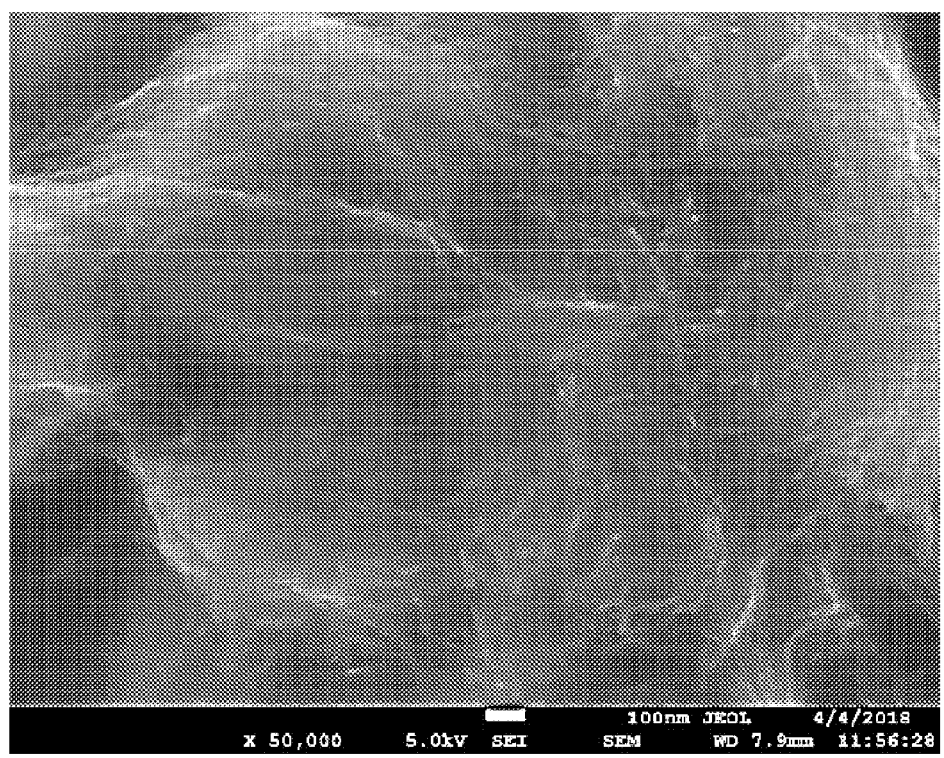
FIG. 8 is an SEM image taken from an electrode of Comparative Example 4.

Referring to the positive electrodes of FIGS. 2 to 4, it may be confirmed that carbon nanotube structures, in which 2 to 10 single-walled carbon nanotube units were bonded side by side, were in the form of a rope. However, with respect to the electrodes of Comparative Examples 1 to 4 in which carbon black, multi-walled carbon nanotubes, or fully dispersed single-walled carbon nanotubes were used, it may be confirmed that the carbon nanotube structure was not formed, but the conductive agents were aggregated on surfaces of the active material layers as illustrated in FIGS. 5 to 8.

Experimental Example 2: Measurement of Powder Resistance of Positive Electrode Slurry The positive electrode slurries used in the preparation of the positive electrodes of Examples 1 to 3 and Comparative Examples 1 to 4 were vacuum-dried at a temperature of 130° C. for 3 hours and then ground to prepare powders. Thereafter, pellets were prepared under a load of 9.8 MPa at 25° C. and a relative humidity of 50% using a Loresta GP instrument from Mitsubishi Chem. Analytec. Co., Ltd. Thereafter, powder resistance was measured by a 4-probe method. Measurement results are presented in Table 1 below.

Experimental Example 3: Measurement of Viscosity of Positive Electrode Slurry

After each of the positive electrode slurries formed during the preparation of the positive electrodes of Examples 1 to 3 and Comparative Examples 1 to 4 was filled to a volume of at least ⅔ of a 250 mL bottle, viscosity was measured at 12 rpm using a Brookfield DV2T LV TJ0 model viscometer with spindle 63(LV-03) at room temperature. Measurement results are presented in Table 1 below.

Experimental Example 4: Measurement of Positive Electrode Adhesion

Adhesion of each of the positive electrodes of Examples 1 to 3 and Comparative Examples 1 to 4 was measured by a 90° peel test method.

Specifically, after a double-sided tape was attached to a slide glass and each electrode punched to a size of 20 mm×180 mm was placed thereon, a 2 kg roller was reciprocated 10 times to attach the electrode to the tape, and the electrode was then pulled at a rate of 200 mm/min using a universal testing machine (UTM, TA instruments) to measure a force detached from the slide glass. In this case, a measurement angle between the slide glass and the electrode was 90°. Measurement results are presented in Table 1 below.

Experimental Example 5: Battery Life Characteristics Evaluation

Each of the positive electrodes of Examples 1 to 3 and Comparative Examples 1 to 4, a negative electrode, and a 15 μm thick polyethylene-based separator were combined to prepare a mono-cell. In this case, graphite, SBR/CMC, and a conductive agent were mixed in a weight ratio of 96.5:2.5:1 to prepare a negative electrode slurry, and the negative electrode slurry was coated on a 10 μm thick copper foil and dried at 100° C. to prepare the negative electrode. Thereafter, an electrolyte solution, in which 1M $LiPF_6$ was dissolved in a mixed solvent (DEC:EC=1:1) of dimethyl carbonate (DEC) and ethylene carbonate (EC), was injected to prepare a lithium secondary battery.

After the lithium secondary battery thus prepared was charged and discharged 60 times under a condition of 0.33 C/0.33 C at 45° C., lifetime characteristics were measured by using charge and discharge efficiency measured. Measurement results are presented in Table 1 below.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Conductive agent specific surface area ($m^2/g$) | 650 | 650 | 650 | 240 | 185 | 185 | 650 |
| Conductive agent amount (wt %) | 0.1 (carbon nanotube structure) | 0.1 (carbon nanotube structure) | 0.05 (carbon nanotube structure) | 1.5 (carbon black) | 0.6 (multi-walled carbon nanotube units) | 0.8 (multi-walled carbon nanotube units | 0.05 (fully dispersed carbon nanotube units |
| Polyvinylidene fluoride amount (wt %) | 1.8 | 1.8 | 1.8 | 2.0 | 1.8 | 2.0 | 1.8 |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| Positive electrode slurry solid content (wt %) | 70.1 | 70.1 | 70.1 | 72.0 | 72.1 | 72.0 | 70.1 |
| Positive electrode slurry viscosity (cPs) | 22,600 | 24,700 | 15,900 | 11,900 | 21,500 | 32,250 | 18,500 |
| Positive electrode slurry powder resistance (Ω · cm) | 28.5 | 41.5 | 53.8 | 154.1 | 72.6 | 29.7 | 1,590 |
| Positive electrode adhesion (gf/20 mm) | 21.6 | 22.8 | 22.4 | 19.8 | 14.2 | 19.1 | 3.2 |
| Life characteristics (%) | 97.5 | 96.9 | 96.4 | 93.7 | 94.6 | 95.3 | 85.6 |

Referring to Table 1, with respect to Examples 1 to 3 which included the carbon nanotube structure, it may be understood that positive electrode adhesions and life characteristics were excellent. With respect to Example 3, since the amount of the carbon nanotube structure was very small, slurry powder resistance was slightly increased, but it was enough to drive the cell, and the life characteristics were excellent.

With respect to Comparative Example 1, since the viscosity of the positive electrode slurry was excessively low, the electrode active material layer was difficult to be uniformly coated and powder resistance and electrode adhesion properties were very poor, and, as a result, life characteristics were also degraded when used in the battery.

With respect to Comparative Example 2, viscosity characteristics of the positive electrode slurry were good, but powder resistance and electrode adhesion properties were deteriorated, and, as a result, life characteristics were also degraded when used in the battery.

With respect to Comparative Example 3, powder resistance characteristics were good, but, since the viscosity of the positive electrode slurry was excessively high, processability was reduced when the electrode was prepared and electrode adhesion properties and life characteristics were also degraded in comparison to the examples.

With respect to Comparative Example 4, since the single-walled carbon nanotube units were excessively dispersed, powder resistance of the positive electrode slurry was excessively high, and it may be understood that adhesion and life characteristics were very poor.

The invention claimed is:

1. An electrode comprising an electrode active material layer,
   wherein the electrode active material layer comprises:
   an electrode active material;
   polyvinylidene fluoride; and
   a conductive agent,
   wherein the conductive agent comprises a carbon nanotube structure in which 2 to 5,000 single-walled carbon nanotube units are bonded to each other, and
   the carbon nanotube structure is included in an amount of 0.01 wt % to 0.5 wt % in the electrode active material layer.

2. The electrode of claim 1, wherein the carbon nanotube structures are interconnected in the electrode to form a network structure.

3. The electrode of claim 1, wherein the single-walled carbon nanotube units are arranged side by side and bonded in the carbon nanotube structure.

4. The electrode of claim 1, wherein the single-walled carbon nanotube unit has an average diameter of 0.5 nm to 10 nm.

5. The electrode of claim 1, wherein the single-walled carbon nanotube unit has an average length of 1 μm to 100 μm.

6. The electrode of claim 1, wherein the carbon nanotube structure has an average diameter of 1 nm to 300 nm.

7. The electrode of claim 1, wherein the single-walled carbon nanotube unit has a specific surface area of 500 $m^2$/g to 1,000 $m^2$/g.

8. The electrode of claim 1, wherein the polyvinylidene fluoride has a weight-average molecular weight of 10,000 g/mol to 1,000,000 g/mol.

9. The electrode of claim 1, wherein the polyvinylidene fluoride comprises modified polyvinylidene fluoride including at least one functional group selected from an acid functional group and an ester functional group.

10. The electrode of claim 9, wherein the functional group is included in an amount of 0.1 wt % to 5 wt % in the modified polyvinylidene fluoride.

11. The electrode of claim 9, wherein the modified polyvinylidene fluoride is included in an amount of 1 wt % to 100 wt % based on a total weight of the polyvinylidene fluoride.

12. The electrode of claim 1, wherein the electrode has an adhesion measured by a 90° peel test of 20.2 gf/20 mm or more.

13. The electrode of claim 1, wherein the electrode is a positive electrode.

14. A method of preparing the electrode of claim 1, the method comprising: preparing a mixture by adding bundle type single-walled carbon nanotubes and polyvinylidene fluoride to a dispersion medium; preparing a conductive agent dispersion including a carbon nanotube structure, in which 2 to 5,000 single-walled carbon nanotube units are bonded to each other, by sonication of the mixture; and forming an electrode slurry including the conductive agent dispersion and an electrode active material, wherein the carbon nanotube structure is included in an amount of 0.01 wt % to 0.5 wt % in a solid content of the electrode slurry.

15. The method of claim 14, wherein the sonication is performed at a power of 800 W to 1,500 W for 0.5 hours to 5 hours.

16. The method of claim 14, wherein the bundle type single-walled carbon nanotubes are included in an amount of 0.1 wt % to 1.0 wt % in the mixture.

17. The method of claim 14, wherein the polyvinylidene fluoride is included in an amount of 0.1 wt % to 20 wt % in the mixture.

18. A secondary battery comprising the electrode of claim 1.

* * * * *